Nov. 5, 1963 P. P. HARDCASTLE 3,109,450
CHECK VALVE
Filed Oct. 2, 1961

Philip P. Hardcastle
INVENTOR.

BY
Robert A. White
ATTORNEY

United States Patent Office 3,109,450
Patented Nov. 5, 1963

3,109,450
CHECK VALVE
Philip P. Hardcastle, Rte. 1, Box 41-0, Hitchcock, Tex.
Filed Oct. 2, 1961, Ser. No. 142,205
5 Claims. (Cl. 137—514)

My present invention relates to a check valve of the type intended for insertion into a fluid conduit for the purpose of preventing reverse flow therethrough. The basic principles of such devices are well known, and the structure commonly includes a valve member which closes against an associated valve seat in response to reverse pressure within the conduit. Under ordinary circumstances, the valve member is actuated by the internal pressure of the system, and reopens upon the return of the upstream pressure to a level higher than that on the downstream side.

One of the primary problems in check valves is the tendency toward abrupt and violent closure. Such valve slamming creates undesirable pressure surges, noise and vibration, and shortens the life of the moving parts. My invention relates to a check valve which overcomes this problem.

One of the primary objects of my invention is to provide a check valve in which the tendency toward abrupt and violent closure is entirely eliminated.

It is also an object of my invention to provide a check valve which is self damped by internal structure to prevent slamming.

A further object of my invention is to provide a check valve in which the closing movement of the valve member in response to reverse pressure is retarded by a damping member mechanically linked thereto.

It is also an object of my invention to provide a check valve in which the reverse pressure tending to slam the valve member into engagement with its seat also acts against an internal damping member to create a damping force which is almost equal to and opposed in direction to that acting on the valve member.

It is a further object of my invention to provide an internally damped check valve which is completely encased within a housing so as to render long and maintenance-free service.

It is a further object of my invention to provide an internally damped check valve which is relatively small and simple in operation, yet is both rugged and economical.

These and other objects are accomplished by the check valve described herein and shown in the attached drawings in which.

Figures 1, 2:
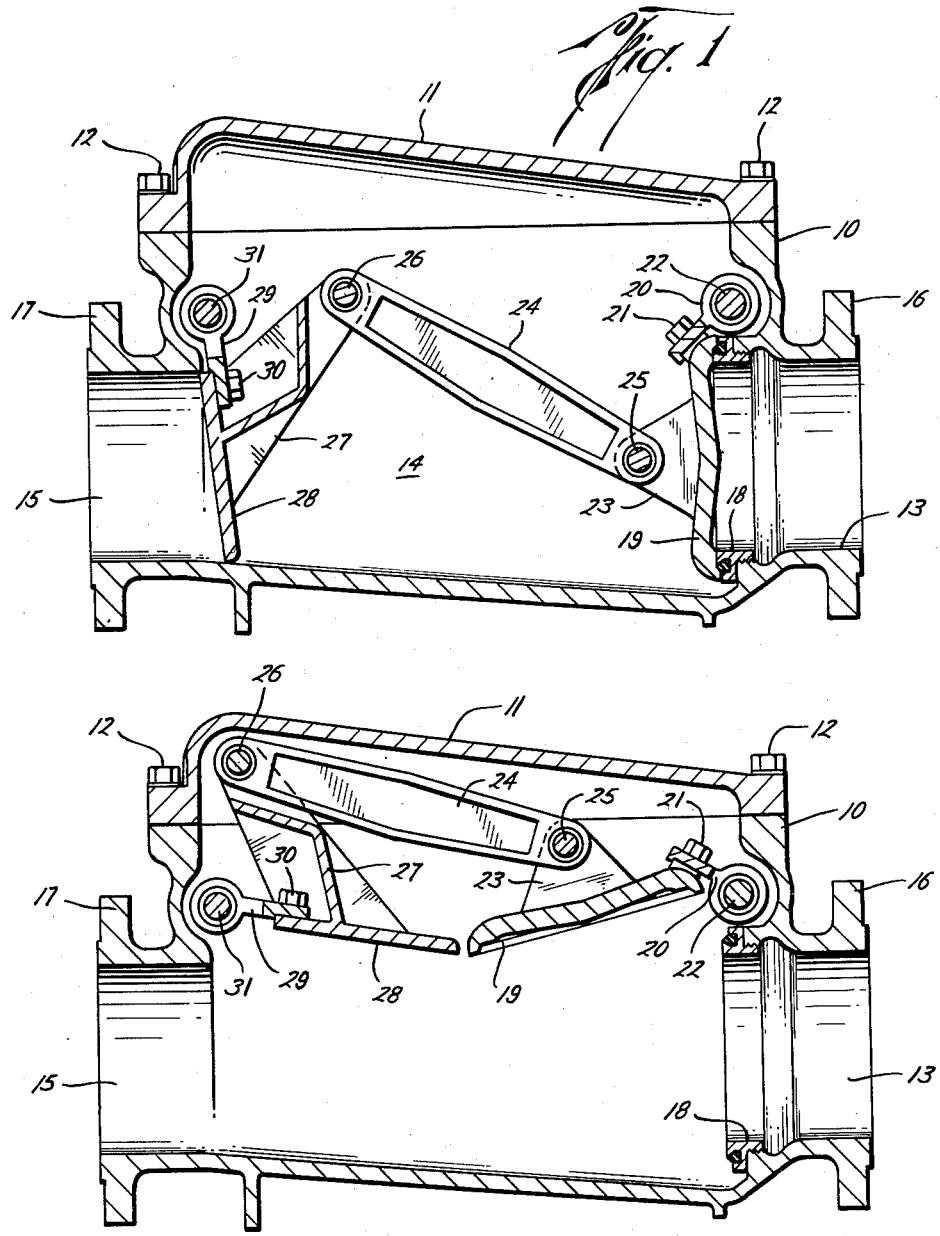
FIG. 1 is a side elevational view of my check valve in a closed position.
FIG. 2 is a side elevational view of my check valve in an open position.

Referring first to FIG. 1, reference numeral 10 indicates the housing of my valve which may be a machined forging. Valve cap 11 is secured to housing 10 by bolts 12. It will be apparent that removal of cap 11 affords ready access to the interior of the valve for inspection and cleaning, and repair or replacement of parts as necessary.

In FIG. 1, normal flow is from valve inlet 13 through valve chamber 14 to valve outlet 15. The inlet 13 and outlet 15 are provided with out-turned flanges 16 and 17 respectively for sealing engagement with a closed fluid conduit.

Near the inlet side of the chamber 14 is replaceable valve seat 18 which in my presently preferred embodiment is threaded directly into the housing 10. Against valve seat 18 is valve clapper 19 which is secured to lug 20 by bolt 21. Passing through lug 20 is the pin 22 which is supported by the walls of the housing 10. The clapper 19 and lug 20 are free to rotate about pin 22, it being apparent in FIG. 1 that the back pressure within valve chamber 14 has equalled or exceeded that at the inlet 13 and moved clapper 19 into closed position.

Integral with the clapper is ear 23 to which arm 24 is secured by pin 25. At the opposite end of arm 24 is a similar pin 26 which joins the arm to bracket 27 on damping member 28. The damping member is connected to lug 29 by bolt 30, and these elements are free to rotate about pin 31, which is supported by the walls of the housing similarly to pin 22.

The valve clapper 19, damping member 28 and arm 24 combine to form a mechanical linkage having four pivots, two of which, 22 and 31, are fixed relative to housing 10, and two of which, 25 and 26, are attached to clapper 19 and valve damping member 28 respectively.

FIG. 2 discloses the position assumed by the linkage in response to normal flow pressures in the system. The housing 10 and cap 11 are so configured as to allow the interlinked elements to move upward to a position clear of the flow path between inlet 13 and outlet 15. While flow continues, the elements remain in the FIG. 2 position, but a cessation thereof or a tendency toward reverse flow as a result of an increase in downstream pressure will initiate closing of the valve. Valve clapper 19 will rotate downwardly about pin 22, and valve damping member 28 will rotate downwardly about pin 31, toward the FIG. 1 position. In the absence of substantial back pressure, the clapper will move into engagement with the valve seat quickly and without undue closing force. However, a sudden pressure reversal which without valve damping member 28 would abruptly slam the valve closed, will, in the disclosed invention, act against the face of valve damping member 28, and the force resulting therefrom will be almost equal in amount and in the reverse direction to that acting on the clapper 19. The damping action is apparent, as the arm 24 compels the valve and valve damping members to act together, and the magnitude of the damping force is determined by the difference between the cross sectional area of valve clapper 19 and that of valve damping member 28, the former obviously being slightly greater than the latter.

The foregoing description makes it apparent how the disclosed structure accomplishes the objects of my invention. For particular installations, the area of valve damping member 28 may be chosen relative to that of member 19 to produce a damping effect which may vary from almost complete damping to very little. Further, my valve is versatile in that the valve damping member 28 may be quickly and easily replaced with a similar member differing in size as necessary to meet the needs of a given installation.

It is desired to protect by Letters Patent the above described modifications and all other modifications and refinements which will occur to one skilled in the art.

I claim:
1. A check valve comprising a housing having an inlet, an outlet, and a valve chamber therewithin, a valve seat adjacent the inlet to said chamber, a clapper pivotally mounted within said valve chamber for rotation into and out of engagement with said valve seat, a damping member pivotally mounted within said valve chamber toward the outlet of said housing for rotation in the opposing direction relative to that of said clapper, said damping member being of lesser area than said clapper, and linking means interconnecting said clapper and said damping member for conjoint action whereby reverse pressure through the outlet of said housing urges said clapper toward said seat and simultaneously exerts an opposing force against said damper.

2. The combination of claim 1 and a closure member removably attached to said housing to afford access to said valve chamber.

3. A check valve comprising a housing having an inlet, an outlet and a valve chamber therewithin, a removable valve seat secured to said housing within said chamber adjacent said inlet, a clapper pivotally mounted within said valve chamber for rotation into and out of engagement with said valve seat, a damping member pivotally mounted within said valve chamber on the outlet side of said clapper for rotation into and out of a position opposing reverse flow, and a mechanical linkage pivotally interconnecting said clapper and said damping member whereby rotation of said clapper toward said valve seat rotates said damping member toward said opposing position.

4. A check valve comprising a housing having an inlet, an outlet and a valve chamber therewithin, a valve seat within said chamber surrounding said inlet, a pair of substantially parallel pivots transversely disposed within said chamber, a clapper rotatably mounted on the one of said pivots toward the inlet of said housing for movement into and out of engagement with said valve seat, a damping member rotatably mounted on the other of said pivots for movement opposing that of said clapper, and linking means interconnecting said clapper and said damping member whereby movement of the former produces said opposing movement of the latter.

5. The combination of claim 4 in which said damping member is substantially parallel to said clapper when said clapper is in engagement with said valve seat.

References Cited in the file of this patent
UNITED STATES PATENTS

| | | |
|---|---|---|
| 1,177,480 | Callan | Mar. 28, 1916 |
| 1,982,189 | Anderson | Nov. 27, 1934 |